Feb. 9, 1943.   C. J. DAVIES ET AL   2,310,763
BLIND MOLDING
Filed Oct. 20, 1941

INVENTORS
CLARENCE J. DAVIES
ALVIN C. LIND
BY
Whittemore, Hulbert + Belknap
ATTORNEYS Patented Feb. 9, 1943

2,310,763

UNITED STATES PATENT OFFICE 2,310,763

BLIND MOLDING

Clarence J. Davies and Alvin C. Lind, Detroit, Mich., assignors to National Automotive Fibres, Inc., Detroit, Mich., a corporation of Delaware Application October 20, 1941, Serial No. 415,834

8 Claims. (Cl. 45—138)

The present invention relates to a blind molding and more particularly to an article used to secure together two pieces of fabric and to fasten the two pieces of fabric to an article.

The present invention finds its widest field of utility in the manufacture of automobile trim panels which are ordinarily covered with fabric, leather, or other suitable trim material.

In the past when it was desired to obtain a two-tone result as by the use of two differently colored pieces of fabric, the common practice was to sew the two fabrics together so as to provide a sewed seam and to thereafter apply the two fabrics as a covering over the panel board. This method was not entirely satisfactory for a number of reasons. In the first place, the sewing operation was undesirable. Furthermore, the sewed seam did not exhibit absolute straight-line regularity, particularly after the composite fabric was applied to the panel board. In many cases the resulting seam was so irregular that it was necessary to cover the seam to conceal it. This led to further difficulties because in many cases the sewed seam after application to the panel board, deviated so far from a straight-line relationship that it was necessary to employ a covering element or molding strip of substantial and undesirable width.

According to the present invention we provide a molding strip which is adapted to serve a dual purpose. The molding strip, in the first place, serves to unite adjacent edges of the two different pieces of fabric so that its first function is to serve as the equivalent of a seam between the two fabrics. In the second place, it serves the function of a break-over strip around which the edge of one of the fabrics is folded. This insures an absolute straight-line relationship of the resulting line of juncture between the two fabrics.

It is very desirable that the line of juncture of the two fabrics as viewed outside of the panel, shall be uniform along opposite sides, and accordingly the strip is formed so as to provide an elevated portion along one side of the seam to compensate for the material beneath the other fabric at the opposite side of the seam.

With the foregoing general remarks in mind it is an object of the present invention to provide a novel blind molding strip of the character described.

It is a further object of the invention to provide a blind molding strip which will serve the dual purpose of means for joining the edges of two adjacent fabrics and means constituting a breaker strip.

More specifically it is an object of the invention to provide a blind molding strip having an edge flange reversely bent upon the main portion of the strip to clampingly engage the adjacent edges of the two pieces of fabric.

It is a further object of the invention to provide a blind molding strip having an elongated body portion, a reversely bent clamping flange along one edge, and an elevated rib along the other edge thereof.

It is a further object of the invention to provide a blind molding strip having a substantially flat intermediate portion, a reversely bent clamping portion along one edge, and an elevated bead or riser portion along the other edge, said bead or riser portion terminating in a downwardly extending flange adapted to resiliently engage the base or panel board to which the structure is attached.

It is a further object of the invention to provide a trim panel having a fabric cover made up of a plurality of pieces of fabric joined together along adjacent edges by means of the novel molding strip disclosed herein.

Other objects of the invention will be apparent as the description proceeds and when taken in conjunction with the accompanying drawing, wherein.

Figure 1:
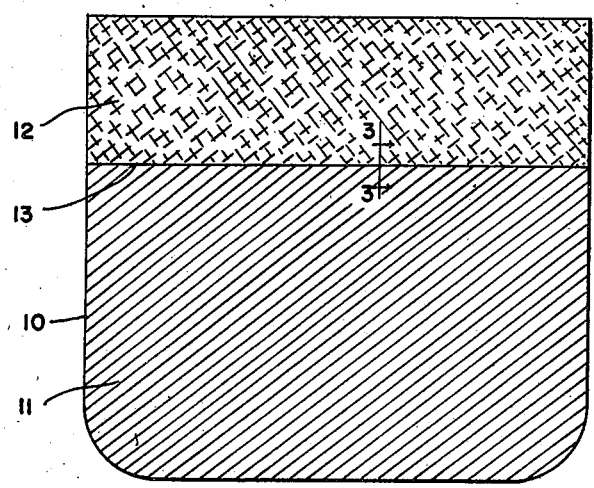
Figure 1 is a front elevation of a trim panel made in accordance with the present invention and employing the novel blind molding strip disclosed herein.
Figure 2:
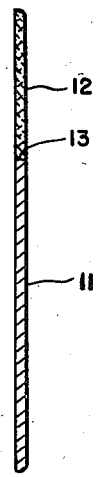
Figure 2 is a side elevation of the trim panel shown in Figure 1.

Referring to Figures 1 and 2, we have shown a trim panel 10, such as is used in the interior trim of automotive vehicles. This trim panel is made up of a panel board which is provided with padding material, such for example as loosely aggregated cotton or other similar fibrous material. In order to impart a finished appearance to the trim panel, the practice is to cover the same with a trim fabric or similar trim material, usually of the same material as employed in the upholstery. Recently fabrics of different colors have been employed in the upholstery, and it is accordingly desired to employ fabrics of correspondingly different colors on the panel board. Thus for example, in Figure 1, we have indicated the lower portion of the board as covered by a fabric 11, whose color is indicated by the hatching to be brown, whereas the upper portion of the panel board is covered with a different trim fabric 12 which is indicated by the hatching to be of orange color. These two fabrics come together along a seam 13 which, as shown in Figure 1, is horizontal and a straight line.

Figure 3:
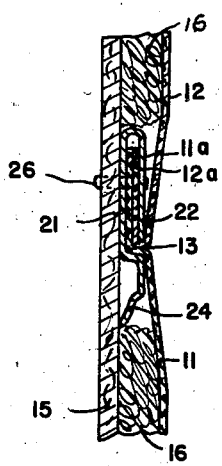
Figure 3 is an enlarged fragmentary section on the line 3—3, Figure 1.
Figure 4:
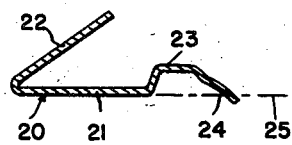
Figure 4 is a transverse section through the molding strip disclosed herein.

In order to provide the trim fabrics 11 and 12 as shown in Figure 1 with the absolute straight seam 13, the construction illustrated in Figures 3 and 4 is employed. Referring now to Figure 3, we have indicated the panel board at 15 and padding material at 16. The padding material as shown in this figure has been removed along a band of width sufficient to receive the blind molding strip 20. The molding strip 20, as best seen in Figure 4, has an intermediate flat portion 21, and a reversely bent clamping flange 22 extending along one edge thereof. Along the other edge of the intermediate flat portion 21 is a raised bead or riser 23 terminating in a downwardly extending flange 24. The molding strip 20 is made of thin gauge sheet metal of sufficient strength to serve the functions later ascribed thereto. It will be observed in Figure 4 that the flange 24 of the strip normally extends downwardly below a line 25, which indicates the plane of the bottom surface of the center portion 21 extended. Accordingly, when the center portion 21 is secured down tightly against a flat surface, the edge of the flange 24 will engage the surface and will be resiliently moved upwardly. This will insure that the outer edge of the flange 24 will always be in firm engagement with the surface to which the molding strip 20 is attached.

As best seen in Figure 3, which shows the molding strip in assembled relation with the trim fabrics 11 and 12, an edge 11a of the fabric 11 is introduced into the space between the flat body portion 21 and the flange 22. The corresponding edge 12a of the other fabric 12 is likewise introduced into the space between the flat body portion 21 and the flange 22. Conveniently, the free edges of the two fabrics may be matched, as shown in Figure 3. The flange 22 is then bent downwardly so as to clamp the free edges of the fabrics 11 and 12 in the position shown. If desired, the body portion 21 of the flange 22 may be provided with punched projections which will firmly clamp the edges of the fabric, or, if preferred, they may be pierced or provided with fastening elements which extend therethrough. In Figure 3 we have shown fastening elements 26, which may take the form of staples extending through the flange 22, the edges 11a and 12a of the fabrics, and the body portion 21 of the molding strip, and also extending through the panel board 15 so as to clamp the assembly thereon.

When the assembly is clamped down onto the panel board 15, as shown in Figure 3, the flange 24 of the strip is bent upwardly and will be retained by its resilience in firm contact with the surface of the panel board 15.

As best seen in Figure 3, the flange 22 is of slightly less width than the base portion 21, and the amount by which the width of the base strip 21 exceeds the width of the flange 22 is approximately equal to the thickness of the fabrics 11 and 12, which must extend between the bead or riser 23 and the free edge of the flange 22 when the same is bent downwardly. This insures what may be referred to as a tight seam, which further adds to the attractive appearance of the composite article.

Ordinarily in producing a trim panel the two fabrics will first be assembled together with a molding strip. Thereafter both of the fabrics will be extended away from the center portion of the molding strip so as to overlie the bead or riser 23, and to expose the downwardly bent flange 22 for further operations.

The strip 20 may then be accurately located on the panel board in this desired location and permanently stapled or otherwise secured thereto. Thereafter the fabric, whose inner edge is uppermost or directly against the bent flange 22, is drawn rearwardly over the panel to the position shown in Figure 3, while the other fabric is permitted to remain in its former position. This results in folding the one fabric, as for example fabric 12 in Figure 3, over the straight edge of the flange 22 so that the flange 22 thus serves the function of a breaker strip and insures a substantially straight edge for the seam 13.

It will be observed that above the seam 13, as seen in Figure 3, and underneath the fabric 12, there is located the following elements: the bent flange 22, the fabric edge 12a, the fabric edge 11a, and the base portion 21 of the strip 20. Accordingly, the fabric 12 immediately above the seam 13 is retained in definitely elevated relationship from the panel board 15. It is desirable that the fabric 11 below the seam 13 shall be symmetrically retained in elevated position, and this is the function of the bead or riser 23. By referring to Figure 3, it will be seen that the bead or riser 23 is of just sufficient height to cause the fabrics 11 and 12 to approach the seam 13 symmetrically.

While we have shown the trim panel provided with padding material as indicated at 16, which raises the fabrics 11 and 12 somewhat beyond the plane of the seam 13, it will be understood that this is not a necessary condition and that in fact, if desired, the padding material can be entirely omitted.

While we have illustrated our blind molding strip in conjunction with an automotive trim panel and have further described only one specific form thereof, it will be understood that this has been done solely to enable those skilled in the art to practice the present invention, the scope of which is indicated by the appended claims.

What we claim as our invention is:

1. A trim panel comprising a panel board, a blind molding strip secured thereto, said molding strip having a reversely bent flange extending along one edge, a cover over said panel board made up of separate pieces of trim fabric secured to said panel board adjacent its edges and having adjacent edges thereof held against relative movement beneath the reversely bent flange, said pieces extending in opposite directions from said strip, whereby said strip is completely concealed and the free edge of said flange forms a breakover strip for one of said pieces, said strip also having means for spacing the other of said pieces from the panel board a distance substantially equal to the combined thickness of said clamped edges of fabric and the clamping portions of said molding strip.

2. A trim panel comprising a panel board, a blind molding strip secured thereto, said molding strip having a reversely bent flange extending along one edge, a cover over said panel board made up of separate pieces of trim material secured to said panel board adjacent its edges and having adjacent edges thereof clamped beneath the reversely bent flange, said pieces extending in opposite directions from said strip, whereby said strip is completely concealed and the free edge of said flange forms a break-over strip for one of said pieces, the other edge of said strip having a raised bead or riser of a height about equal to the combined double thickness of strip material and the clamped edges of said pieces of trim material.

3. A trim panel comprising a panel board, a blind molding strip secured thereto, said molding strip having a reversely bent flange extending along one edge, a cover over said panel board made up of separate pieces of trim fabric secured to said panel board adjacent its edges and having adjacent edges thereof clamped beneath the reversely bent flange, said pieces extending in opposite directions from said strip, whereby said strip is completely concealed and the free edge of said flange forms a break-over strip for one of said pieces, said strip being provided adjacent said flange with a raised bead or riser for spacing the other of said pieces from the panel board a distance substantially equal to the combined double thickness of strip material and the clamped edges of said pieces of trim fabric.

4. A blind molding strip of sheet metal comprising a flat base portion having a reversely bent flange of slightly less width than the base portion extending along one edge, and a raised bead or riser extending along the other edge, the free edge of said bead or riser extending downwardly below the plane of the bottom of said base portion, whereby said free edge is bent upwardly when said base portion is secured to a flat surface.

5. A trim panel having a panel board, two sheets of padding material spaced apart on said panel board, two trim fabrics covering said sheets of padding material, one for each of said spaced sheets of padding material, an edge portion of one of said fabrics being folded under said fabric in the space between said sheets of padding material, the second fabric having an inturned portion at the fold of the first mentioned fabric and having an edge portion between the folded edge portion of the first mentioned fabric and the panel board, and a molding strip secured to the panel board in the space between the sheets of padding material, said strip having a base portion between the panel board and the edge portion aforesaid of the second fabric and having a return bent flange between the unfolded main portion of the first mentioned fabric and the folded edge portion thereof forming a break-over strip for the fold of the first mentioned fabric and clamping the folded edge of the first mentioned fabric and the underlying edge portion of the second fabric upon the base portion of the strip, said strip also having a riser portion beneath the main portion of the second fabric in spaced relation to said flange and supporting the main portion of the second fabric substantially flush with the main portion of the first mentioned fabric and holding the inturned portion of the second fabric close to the fold of the first mentioned fabric.

6. A trim panel having a panel board, two sheets of padding material spaced apart on said panel board, two trim fabrics covering said sheets of padding material, one for each of said spaced sheets of padding material, an edge portion of one of said fabrics being folded under said other fabric in the space between said sheets of padding material, the second fabric having an inturned portion at the fold of the first mentioned fabric and having an edge portion between the folded edge portion of the first mentioned fabric and the panel board, a molding strip having a base portion between the panel board and the edge portion of the second fabric, having a second portion between the unfolded main portion of the first mentioned fabric and the folded edge portion thereof forming a break-over strip for the fold of the first mentioned fabric and clamping the folded edge of the first mentioned fabric and the underlying edge portion of the second fabric upon the base portion of the strip, and having a third portion beneath the main portion of the second fabric in spaced relation to the second portion aforesaid supporting said main portion of the second fabric substantially flush with the main portion of the first mentioned fabric and holding the inturned portion of the second fabric close to the fold of the first mentioned fabric, and means carried by the panel board and extending through the base and second portions of the strip and through the interposed edge portions of said fabrics to hold the parts in assembled relation.

7. A molding strip having a substantially flat base attachable to a support, said base being provided at one longitudinal edge thereof with a return bent flange and provided in laterally spaced relation to the free edge of said flange with an inverted substantially channel shaped riser portion, the outer side of said riser portion extending across and beyond the plane of the base portion for pressure engagement with the support for said base.

8. A metal molding strip having a base of predetermined width attachable to a support, said base being provided at one longitudinal edge thereof with a return bent flange of less width than the base and provided in laterally spaced relation to the free edge of said flange with an inverted substantially channel shaped riser portion, the outer side of said riser portion inclining across and beyond the plane of the base portion for pressure engagement with the support for said base.

CLARENCE J. DAVIES.
ALVIN C. LIND.